United States Patent
Genise et al.

Patent Number: 6,149,545
Date of Patent: Nov. 21, 2000

[54] AUTOMATED TRANSMISSION UPSHIFT CONTROL

[75] Inventors: Thomas A. Genise, Dearborn; Daniel P. Janecke, Kalamazoo, both of Mich.; Marcel Amsallen, Falling Waters, W. Va.

[73] Assignee: Eaton Corporation, Cleveland, Ohio

[21] Appl. No.: 09/232,252

[22] Filed: Jan. 14, 1999

[51] Int. Cl.$^7$ ............................. F16H 59/30; F16H 59/00
[52] U.S. Cl. .............................................. 477/124; 74/335
[58] Field of Search .................. 74/335, 336 R; 477/123, 124

[56] References Cited

U.S. PATENT DOCUMENTS

| | | | |
|---|---|---|---|
| 4,361,060 | 11/1982 | Smyth | 74/866 |
| 4,507,736 | 3/1985 | Klatt | 477/123 X |
| 4,576,065 | 3/1986 | Speranza et al. | 477/124 |
| 4,595,986 | 6/1986 | Daubenspeck et al. | 364/424.1 |
| 4,648,290 | 3/1987 | Dunkley et al. | 477/78 |
| 4,850,236 | 7/1989 | Braun | 74/337 |
| 4,913,269 | 4/1990 | Dunkley et al. | 192/3.63 |
| 4,947,331 | 8/1990 | Speranza | 364/424.1 |
| 5,172,609 | 12/1992 | Nitz et al. | 74/866 |
| 5,219,391 | 6/1993 | Edelen et al. | 74/335 |
| 5,272,939 | 12/1993 | Markyvech | 74/866 |
| 5,335,566 | 8/1994 | Genise | 74/335 |
| 5,389,053 | 2/1995 | Steeby et al. | 477/123 |
| 5,390,561 | 2/1995 | Stine | 74/331 |
| 5,409,432 | 4/1995 | Steeby | 477/71 |
| 5,425,689 | 6/1995 | Genise | 477/120 |
| 5,435,212 | 7/1995 | Menig | 74/745 |
| 5,479,345 | 12/1995 | Amsallen | 364/424.1 |
| 5,487,004 | 1/1996 | Amsallen | 364/424.1 |
| 5,489,247 | 2/1996 | Markyvech | 477/120 |
| 5,490,063 | 2/1996 | Genise | 364/424.1 |
| 5,509,867 | 4/1996 | Genise | 477/120 |
| 5,533,946 | 7/1996 | Markyvech | 477/78 |
| 5,582,069 | 12/1996 | Genise | 74/335 |
| 5,620,392 | 4/1997 | Genise | 477/120 |
| 5,655,407 | 8/1997 | Dresden et al. | 74/336 |
| 5,679,093 | 10/1997 | Desautels et al. | 477/124 X |
| 5,713,445 | 2/1998 | Davis et al. | 192/35 |
| 5,737,978 | 4/1998 | Stine | 74/606 |
| 5,743,143 | 4/1998 | Carpenter et al. | 74/335 |
| 5,766,111 | 1/1998 | Steeby et al. | 477/124 |
| 5,944,630 | 8/1999 | Omote | 74/335 X |

*Primary Examiner*—Charles A. Marmor
*Assistant Examiner*—Roger Pang
*Attorney, Agent, or Firm*—Howard D. Gordon

[57] ABSTRACT

A method/system for controlling upshifting in an automated mechanical transmission system (10) utilized on a vehicle preferably having an ECU (28) controlled engine brake (46). When an upshift from a currently engaged ratio (GR) is required ($ES > E\acute{S}_{U/S}$), skip upshifts ($GR_{TARGET} = GR+N$, $N>1$) and then single upshifts ($GR_{TARGET} = GR+1$) are evaluated in sequence.

17 Claims, 4 Drawing Sheets

AUTOMATED TRANSMISSION UPSHIFT CONTROL

RELATED APPLICATIONS

This application is related to copending U.S. Ser. No. 09/231,951, titled AUTOMATED TRANSMISSION DOWNSHIFT CONTROL filed Jan. 15, 1999 and assigned to EATON CORPORATION, assignee of this application.

BACKGROUND OF THE INVENTION

1. Field of the Invention

The present invention relates to a control method/system for controlling upshifting in an at least partially automated mechanical transmission system. In particular, the present invention relates to the control of upshifting in a vehicular automated mechanical transmission system wherein the system senses conditions indicative of an upshift from a currently engaged gear ratio (GR) and evaluates, in sequence, the desirability of skip upshifts and then single upshifts and commands upshifts deemed desirable.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639. The use of engine brakes (also known as compression brakes, exhaust brakes or Jake brakes) and transmission controls utilizing same are known in the prior art, as may be seen by reference to U.S. Pat. Nos. 5,409,432 and 5,425,689.

Controls for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

SUMMARY OF THE INVENTION

The control of the present invention provides a control for a vehicular automated mechanical transmission system which will sense conditions indicative of upshifting from a currently engaged gear ratio, and will evaluate, in sequence, the desirability of large skip upshifts, then single skip upshifts, and then single upshifts, and will command an upshift to the first target ratio deemed to be desirable under current vehicle operating conditions.

The foregoing is accomplished, in a preferred embodiment of the present invention, by setting (i) a maximum acceptable shift time for completing upshifts and (ii) upshift feasibility rules to determine if a proposed upshift is feasible under current vehicle operating conditions. The upshift feasibility rules comprise a two-part test, (a) can the upshift be completed above a minimum engine speed? and (b) when completed, will the engine, in the target ratio, provide sufficient torque at the drive wheels to allow at least a minimum vehicle acceleration?

Large skip upshifts (i.e., upshifts from GR to GR+3) and then single skip upshifts (i.e., upshifts to GR+2) are evaluated to determine if (i) they can be completed within the maximum acceptable shift time and (ii) if they are feasible. If the evaluated skip upshift meets both tests, it is desirable and is commanded. If a skip shift is not desirable, a single upshift (i.e., upshifts to GR+1) is evaluated for feasibility (only) and commanded if feasible.

Accordingly, an improved upshift control for automated mechanical transmissions is provided which will automatically evaluate and command desirable skip and then single upshifts.

This and other objects and advantages of the present invention will become apparent from a reading of the following description of the preferred embodiment taken in connection with the attached drawings.

DESCRIPTION OF THE PREFERRED EMBODIMENT

Figure 1:
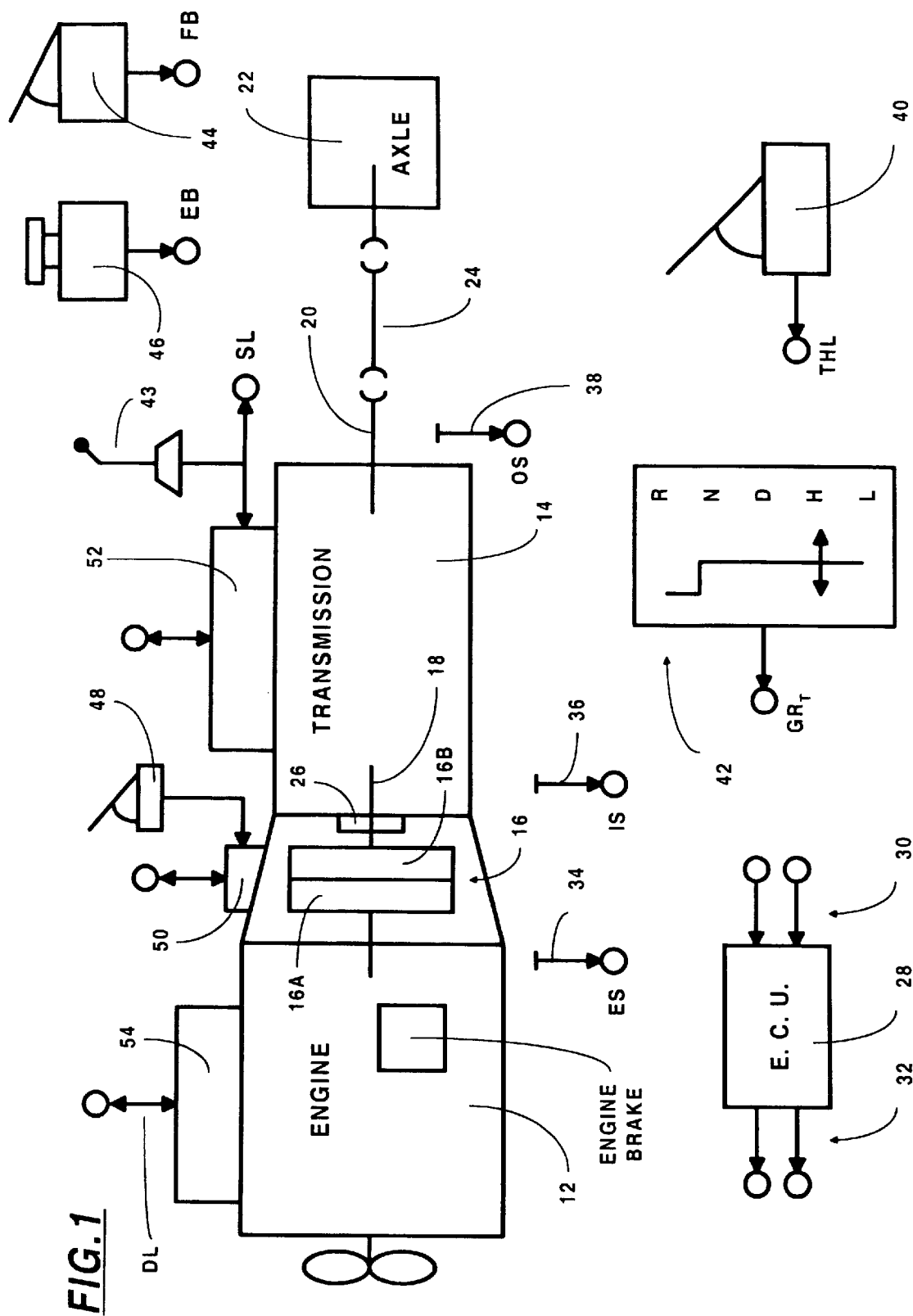
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRT) indicative thereof.

As is known, if the clutch is engaged, the rotational speed of the engine may be determined from the speed of the input shaft and/or the speed of the output shaft and the engaged transmission ratio (ES=IS=OS*GR).

Alternatively, for systems wherein at least some of the shifting is controlled by a manual shift lever 43, a sensor may be provided for providing an input signal (SL) indicative of the position of the shift lever. Systems of this type will include systems having a manually shifted main section and an automated splitter section. Sensors of this basic type may be seen by reference to U.S. Pat. No. 5,743,143.

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850,236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged and disengaged condition of clutch 16 may be sensed by a position sensor (not shown) or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

As is known, for automated shifting, the ECU 28 must determine when upshifts and downshifts are required and if a single or skip shift is desirable (see U.S. Pat. Nos. 4,361,060; 4,576,065; 4,916,979 and 4,947,331).

Figure 2:
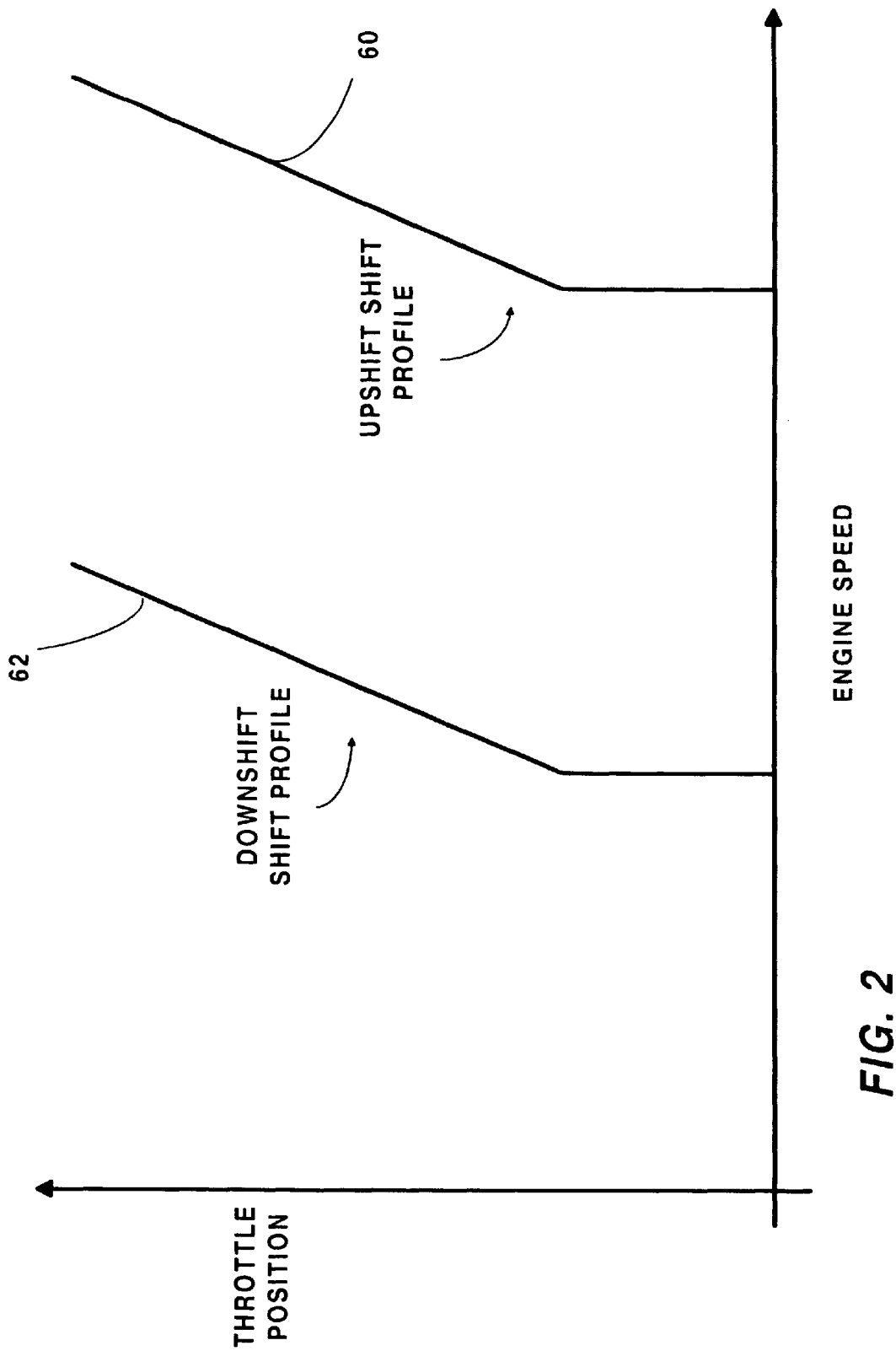
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

Shift profile 60 is a graphical representation of the engine speeds at which upshifts from a currently engaged ratio (GR) are indicated ($ES_{U/S}$) for various degrees of throttle displacement (i.e., demand).

According to the control of a preferred embodiment of the present invention, if an upshift from a currently engaged ratio (GR) is required (i e., if at current throttle displacement engine speed (ES) is greater than the upshift engine speed ($ES_{U/S}$) on shift point profile 60), a sequence is initiated for identifying the desirable upshift target ratio ($GR_{TARGET}$), if any. The control, in sequence, will evaluate skip and then single upshifts for desirability and command an upshift to the first potential target ratio deemed desirable.

A maximum time for completion of an upshift is established based upon considerations for shift quality, vehicle performance, etc. For heavy-duty trucks, by way of example, this time value may have a value of about 1.0 to 2.0 seconds.

A two-part feasibility test is established:
(1) Will the engine speed be at a synchronous value above a preselected minimum engine speed $ES_{MIN}$, given current/assumed engine and vehicle deceleration rates? The $ES_{MIN}$, by way of example, is selected at about 1100 to 1300 rpm, which for a typical heavy-duty diesel engine is at or near a peak torque rpm. The engine deceleration rate may be evaluated with or without the use of engine braking. This logic may be appreciated by reference by U.S. Pat. Nos. 5,335,566 and 5,425,689, the disclosures of which are incorporated herein by reference. Use of engine brakes (also called exhaust and Jake brakes) to enhance upshifting is known, as may be seen by reference to U.S. Pat. No. 5,409,432; and
(2) At completion of a proposed upshift, will torque at the drive wheels provide sufficient torque for at least minimal vehicle acceleration? (See U.S. Pat. Nos. 5,272,939 and 5,479,345, the disclosures of which are incorporated herein by reference.

If one or both of these parts of the feasibility test are not satisfied, the upshift to an evaluated target ratio (GR+1, 2, 3, . . . ) is not feasible and will not be commanded.

According to the logic of the present invention, upon sensing that an upshift is indicated ($ES>ES_{U/S}$), in sequence:
(1) A big skip upshift from the currently engaged ratio GR to GR+3 (without using engine brakes) is evaluated and if an upshift to GR+3 (i) feasible and (ii) can be accomplished within the maximum time, it is desirable and an upshift to GR+3 will be initiated. If not,
(2) Then a single skip upshift to GR+2 (without using engine brakes) is evaluated and if an upshift to GR+2 is (i) feasible and (ii) can be accomplished within the maximum time, it is desirable and an upshift to GR+2 will be initiated. If not,
(3) Then a single upshift to GR+1 (without using engine brakes) is evaluated and if an upshift to GR+1 (without using engine brakes) is feasible, an upshift to GR+1 (without using engines brakes) will be commanded. If not,
(4) Then a single upshift to GR+1 using the engine brake is evaluated and if an upshift to GR+1 using the engine brake is feasible, an upshift to GR+1 using the engine brake will be commanded. If not,
(5) No upshift will be initiated.

Figure 3A:
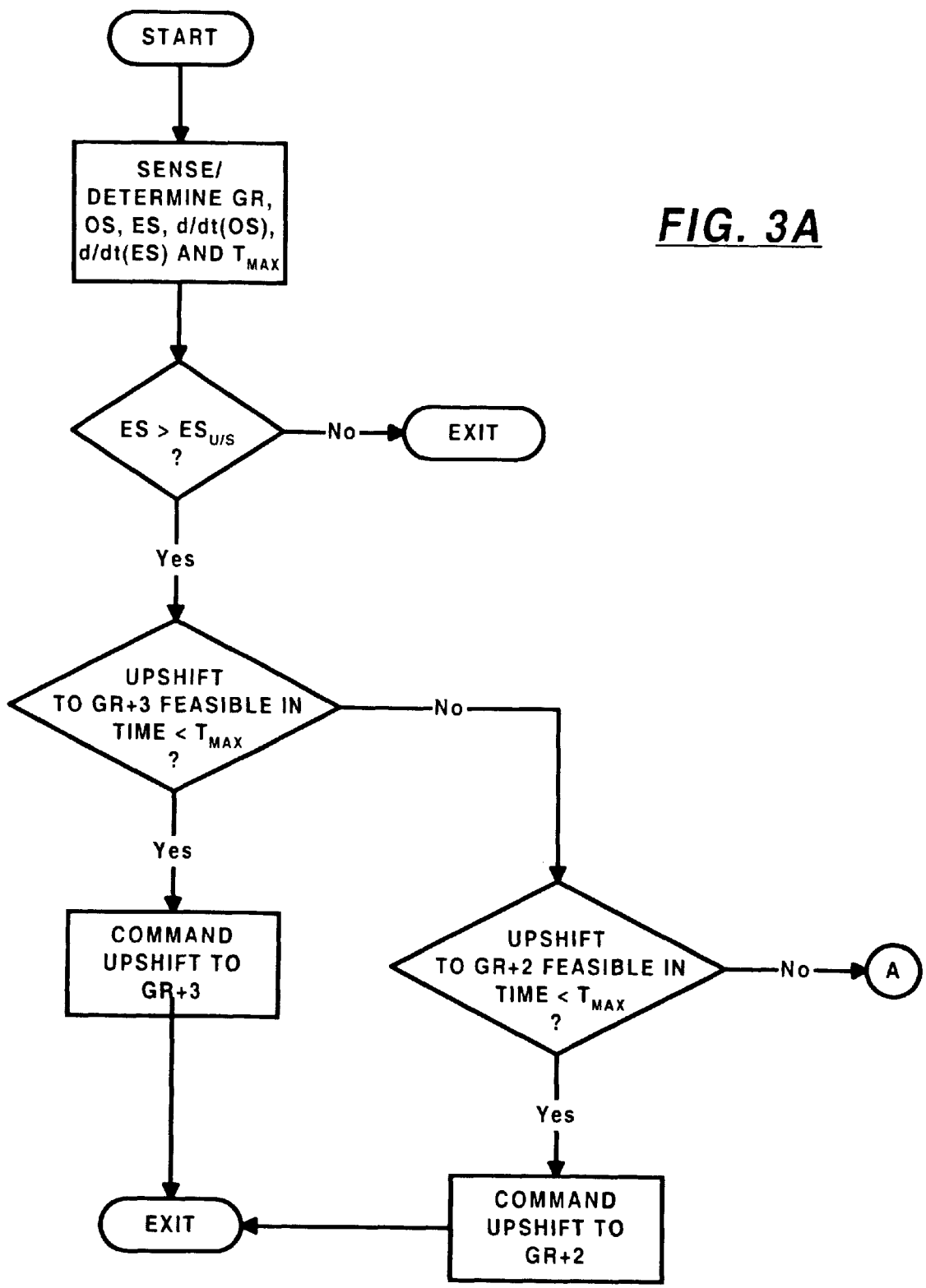
FIGS. 3A and 3B are schematic illustrations, in flow chart format, of the control of the present invention.
Figure 3B:
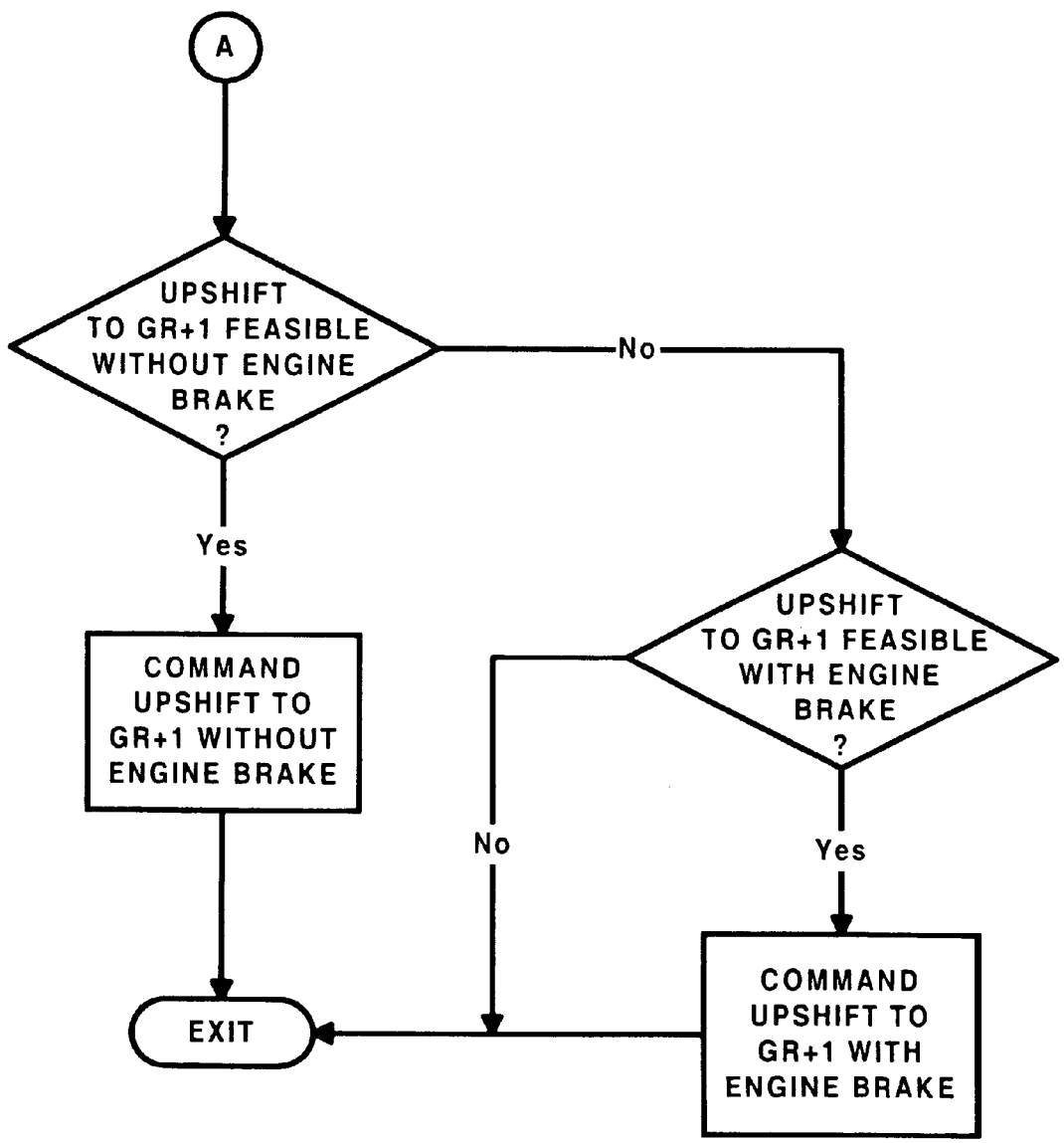

The control of the present invention is shown in flow chart format in FIGS. 3A and 3B. The control logic of the present invention will cause upshifts to the gear ratio, resulting in an engine speed close to, but not less than, a calibrated value, $ES_{MIN}$, which is at or near the peak torque rotational speed of the engine. Although only skip shifts of two ratio steps are illustrated, the present invention also is applicable to skip shifts of three or more ratios.

In one alternative embodiment of the present invention, if evaluated skip upshifts (without using engine brakes) are found not to be feasible, then the same upshift may be evaluated and commanded using the engine brakes.

In another alternative embodiment of the present invention, when evaluating a single upshift to GR+1 using the engine brake, the minimum engine speed reference (ES$_{MIN}$) may be lowered to a value 100 to 200 rpm lower than the 1100–1300 rpm value used to evaluate other upshifts. In any event, as such a shift will be a low-quality shift, it is preferable to increase the probability of the shift being determined to be feasible.

Accordingly, it may be seen that an improved control system/method for controlling upshifting in an at least partially automated mechanical transmission system in a vehicle preferably having a manually operated engine brake system is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling automatic upshifting in a vehicular automated mechanical transmission system (10) for a vehicle comprising a fuel-controlled engine (12) having a maximum torque rotational speed, a multiple-speed mechanical transmission (14), and a controller (28) for receiving input signals (30) including one or more of signals indicative of engine speed (ES), engaged gear ratio (GR) and vehicle speed (OS), and to process said input signals in accordance with logic rules to issue command output signals (32) to transmission system actuators including a transmission actuator (52) effective to shift said transmission, said method characterized by:
   (i) establishing a maximum acceptable time (T$_{MAX}$) for completion of skip upshifts;
   (ii) establishing an upshift feasibility criteria whereby upshifts into a target gear ratio are considered feasible only if, under sensed vehicle operating conditions,
      (a) substantial synchronization can be obtained above a predetermined engine speed substantially equal to maximum torque rotational speed and
      (b) at engagement of the target ratio, the vehicle will be capable of at least a predetermined acceleration (dOS/dt);
   (iii) upon sensing a requirement (ES>ES/U/S) for an upshift from an engaged gear ratio (GR), in sequence:
      (a) determining if a skip upshift of two ratios from the currently engaged ratio (GR$_{TARGET}$=GR+2) is feasible within a time no greater than said maximum acceptable time and, if so, commanding a skip upshift of two ratios from the currently engaged ratio; if not,
      (b) then determining if a single upshift (GR$_{TARGET}$=GR+1) without using engine brakes is feasible and, if feasible, commanding a single upshift from the currently engaged ratio without using engine brakes.

2. The method of claim 1 wherein said vehicle includes an engine brake operable by command output signals from said controller and comprising the further steps, after step (iii)(b), of:
   (c) if a single upshift without using engine brakes is not feasible, then determining if a single upshift with use of engine brakes is feasible and, if so, commanding a single upshift from currently engaged ratio using engine brakes and, if not,
   (d) then retaining the transmission engaged in the currently engaged ratio.

3. The method of claim 1 comprising the further step, prior to step (iii)(a), of:
   (e) determining if a skip upshift of three ratios from the currently engaged ratio (GR$_{TARGET}$=GR+3) is feasible within a time no greater than said maximum acceptable time and, if so, commanding a skip upshift of three ratios from said currently engaged ratio and, if not, then proceeding to step (iii)(a).

4. The method of claim 2 comprising the further step, prior to step (iii)(a), of:
   (e) determining if a skip upshift of three ratios from the currently engaged ratio (GR$_{TARGET}$=GR+3) is feasible within a time no greater than said maximum acceptable time and, if so, commanding a skip upshift of three ratios from said currently engaged ratio and, if not, then proceeding to step (iii)(a).

5. The method of claim 1 wherein said transmission (14) is drivingly coupled to said engine (12) by a manually controlled clutch (16).

6. The method of claim 1 wherein said maximum acceptable time is about 1.0 to 2.0 seconds.

7. The method of claim 1 wherein said engine is a diesel engine and said predetermined engine speed is about 1100 to 1300 rpm.

8. The method of claim 1 wherein determining feasibility of an upshift into a target ratio includes:
   determining as a function of at least the currently engaged gear ratio and said input signals indicative of (i) current engine torque and (ii) current vehicle acceleration, an expected required drivewheel torque (T$_0$) to maintain at least said minimum vehicle acceleration (A$_0$) under current vehicle operating conditions;
   determining as a function of (i) the expected required drivewheel torque (T$_0$) to maintain at least said minimum vehicle acceleration (A$_0$) under current vehicle operating conditions, (ii) the gear ratio of the selected target gear ratio and (iii) the expected maximum available torque to the drivewheels in the target transmission ratio (206), if said expected maximum available torque will at least equal said expected required drivewheel torque upon engagement of the target transmission ratio if the selected shift is implemented, and
   causing the initiation of a selected shift, only upon a determination of said maximum available torque, that will at least equal said expected required drivewheel torque upon engagement of the target transmission ratio.

9. The method of claim 1 wherein determining feasibility of an upshift into a target ratio includes:
   determining as a function of at least said input signals indicative of (i) current engine torque and (ii) current vehicle acceleration, an expected vehicle acceleration (A$_0$) under current vehicle operating conditions and at zero engine torque to the drive wheels;
   determining as of function of (i) the expected vehicle acceleration (A$_0$) under current vehicle operating conditions and at zero engine torque to the drive wheels, (ii) the gear ratio of the selected target gear ratio and (iii) the expected input shaft acceleration during a shift into the target gear ratio, the feasibiliity or infeasibility of achieving substantially synchronous conditions for engagement of the target ratio if the selected shift is implemented.

10. The method of claim 1 wherein said vehicle includes an engine brake operable by command output signals from said controller, and step (iii)(a) comprises:

(a-1) determining if a skip upshift of two ratios from the currently engaged ratio (GRTARGET=GR+2) without using engine brakes is feasible within a time no greater than said maximum acceptable time and, if so, commanding a skip upshift of two ratios from the currently engaged ratio; if not, (a-2) determining if a skip upshift of two ratios from the currently engaged ratio (GRTARGET=GR+2) using engine brakes is feasible within a time no greater than said maximum acceptable time and, if so, commanding a skip upshift of two ratios from the currently engaged ratio.

11. A control system for controlling automatic upshifting in a vehicular automated mechanical transmission system (10) for a vehicle comprising a fuel-controlled engine (12) having a maximum torque rotational speed, a multiple-speed mechanical transmission (14), and a controller (28) for receiving input signals (30) including one or more of signals indicative of engine speed (ES), engaged gear ratio (GR) and vehicle speed (OS), and to process said input signals in accordance with logic rules to issue command output signals (32) to transmission system actuators including a transmission actuator (52) effective to shift said transmission, said control system including logic rules for:

(i) establishing a maximum acceptable time (TMAX) for completion of skip upshifts;

(ii) establishing an upshift feasibility criteria whereby upshifts into a target gear ratio are considered feasible only if, under sensed vehicle operating conditions,
   (a) substantial synchronization can be obtained above a predetermined engine speed substantially equal to said maximum torque rotational speed and
   (b) at engagement of the target ratio, the vehicle will be capable of at least a predetermined acceleration (dOS/dt);

(iii) upon sensing a requirement (ES>ES/U/S) for an upshift from an engaged gear ratio (GR), in sequence:
   (a) determining if a skip upshift of two ratios from the currently engaged ratio (GRTARGET=GR+2) is feasible within a time no greater than said maximum acceptable time and, if so, commanding a skip upshift of two ratios from the currently engaged ratio; if not, (b) then determining if a single upshift (GRTARGET=GR+1) without using engine brakes is feasible and, if feasible, commanding a single upshift from the currently engaged ratio without using engine brakes.

12. The control system of claim 11 wherein said vehicle includes an engine brake operable by command output signals from said controller and further comprising logic rules, after step (iii)(b), for:

(c) if a single upshift without using engine brakes is not feasible, then determining if a single upshift with use of engine brakes is feasible and, if so, commanding a single upshift from currently engaged ratio using engine brakes and, if not, (d) then retaining the transmission engaged in the currently engaged ratio.

13. The control system of claim 11 further comprising logic rules, prior to step (iii)(a), for:

(e) determining if a skip upshift of three ratios from the currently engaged ratio (GRTARGET=GR+3) is feasible within a time no greater than said maximum acceptable time and, if so, commanding a skip upshift of three ratios from said currently engaged ratio and, if not, then proceeding to step (iii)(a).

14. The control system of claim 12 further comprising logic rules, prior to step (iii)(a), for:

(e) determining if a skip upshift of three ratios from the currently engaged ratio (GRTARGET=GR+3) is feasible within a time no greater than said maximum acceptable time and, if so, commanding a skip upshift of three ratios from said currently engaged ratio and, if not, then proceeding to step (iii)(a).

15. The control system of claim 11 wherein said transmission (14) is drivingly coupled to said engine (12) by a manually controlled clutch (16).

16. The control system of claim 11 wherein said maximum acceptable time is about 1.0 to 2.0 seconds.

17. The control system of claim 11 wherein said engine is a diesel engine and said predetermined engine speed is about 1100 to 1300 rpm.

* * * * *